United States Patent
Xie et al.

(10) Patent No.: US 11,531,821 B2
(45) Date of Patent: Dec. 20, 2022

(54) INTENT RESOLUTION FOR CHATBOT CONVERSATIONS WITH NEGATION AND COREFERENCES

(71) Applicant: salesforce.com, inc., San Francisco, CA (US)

(72) Inventors: Tian Xie, Los Altos, CA (US); Xinyi Yang, San Mateo, CA (US); Caiming Xiong, Menlo Park, CA (US); Wenhao Liu, Redwood City, CA (US); Huan Wang, Fremont, CA (US); Wenpeng Yin, Palo Alto, CA (US); Jin Qu, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 61 days.

(21) Appl. No.: 16/993,257

(22) Filed: Aug. 13, 2020

(65) Prior Publication Data
US 2022/0050968 A1 Feb. 17, 2022

(51) Int. Cl.
*G06F 40/30* (2020.01)
*G10L 15/22* (2006.01)
*H04L 51/02* (2022.01)

(52) U.S. Cl.
CPC .............. *G06F 40/30* (2020.01); *G10L 15/22* (2013.01); *H04L 51/02* (2013.01)

(58) Field of Classification Search
CPC .............. G06F 16/3329; G06F 16/3344; G06F 16/90332; G06F 40/30; G10L 15/22; H04L 51/02
See application file for complete search history.

(56) References Cited

U.S. PATENT DOCUMENTS 5,960,384 A * 9/1999 Brash .................. G06F 40/205
704/235
8,577,671 B1 * 11/2013 Barve .................. G06F 40/40
704/9

(Continued)

OTHER PUBLICATIONS

Amazon, "Setting up AWS Chatbot," Date Unknown, two pages, [Online] [Retrieved on Dec. 8, 2020] Retrieved from the Internet <URL: https://docs.aws.amazon.com/chatbot/latest/adminguide/setting-up.html>.

(Continued)

*Primary Examiner* — Eric Yen
(74) *Attorney, Agent, or Firm* — Fenwick & West LLP

(57) ABSTRACT

A system performs conversations with users using chatbots customized for performing a set of tasks. The system may be a multi-tenant system that allows customization of the chatbots for each tenant. The system processes sentences that may include negation or coreferences. The system determines a confidence score for an input sentence using an intent detection model, for example, a neural network. The system modifies the sentence to generate a modified sentence, for example, by removing a negation or by replacing a pronoun with an entity. The system generates a confidence score for the modified sentence using the intent detection model. The system determines the intent of the sentence based on the confidence scores of the sentence and the modified sentence. The system performs tasks based on the determined intent and performs conversations with users based on the tasks.

37 Claims, 9 Drawing Sheets

(56) References Cited

U.S. PATENT DOCUMENTS

| | | | | |
|---|---|---|---|---|
| 8,606,568 | B1* | 12/2013 | Tickner | G10L 15/02 704/231 |
| 8,825,472 | B2* | 9/2014 | Raghuveer | G06Q 10/10 704/7 |
| 2011/0288852 | A1* | 11/2011 | Dymetman | G06F 40/45 704/4 |
| 2012/0290290 | A1* | 11/2012 | Tur | G06F 40/30 704/235 |
| 2015/0039292 | A1* | 2/2015 | Suleman | G06F 40/216 704/9 |
| 2016/0350406 | A1* | 12/2016 | Byron | G06F 16/3344 |
| 2019/0163745 | A1* | 5/2019 | Beller | G09B 19/00 |
| 2020/0152184 | A1* | 5/2020 | Steedman Henderson | G06F 40/35 |
| 2020/0184959 | A1* | 6/2020 | Yasa | G10L 15/1815 |
| 2021/0019371 | A1* | 1/2021 | Saha | G06F 40/247 |
| 2021/0082420 | A1* | 3/2021 | Kraljic | G10L 15/1815 |
| 2021/0110815 | A1* | 4/2021 | Maeng | G06F 3/017 |
| 2021/0151039 | A1* | 5/2021 | Wu | G06F 40/30 |
| 2021/0174783 | A1* | 6/2021 | Wieman | G10L 15/063 |
| 2021/0192134 | A1* | 6/2021 | Yue | G06F 3/04817 |
| 2021/0217414 | A1* | 7/2021 | Hara | H04N 21/472 |
| 2021/0287667 | A1* | 9/2021 | Tan | G06F 40/30 |

OTHER PUBLICATIONS

Google, "Google Apps Script bot," Dec. 7, 2020, four pages, [Online] [Retrieved on Dec. 8, 2020] Retrieved from the Internet <URL: https://developers.google.com/hangouts/chat/quickstart/apps-script-bot>.

Parr, B., "Introducing Octane AI, The Easiest Way to Create a Bot," Nov. 2, 2016, eight pages, [Online] [Retrieved on Dec. 8, 2020] Retrieved from the Internet <URL: https://medium.com/@benparr/introducing-octane-ai-the-easiest-way-to-create-a-bot-1b5b9615405>.

Schlicht, M., "The Complete Beginner's Guide To Chatbots," Apr. 20, 2016, 22 pages, [Online] [Retrieved on Dec. 8, 2020] Retrieved from the Internet <URL: https://chatbotsmagazine.com/the-complete-beginner-s-guide-to-chatbots-8280b7b906ca?gi=9ff4477a51cc>.

* cited by examiner

INTENT RESOLUTION FOR CHATBOT CONVERSATIONS WITH NEGATION AND COREFERENCES

BACKGROUND

Field of Art

This disclosure relates in general to chatbot conversations in online system, and in particular to intent resolution for chatbot conversations in online systems in presence of negation and coreferences.

Description of the Related Art

Online systems often user chatbots for interacting with users. A chatbot provides an automated conversational interface for users of the online system. Chatbots allow users to interact with the online system in a natural way, for example, using voice and natural language. For example, a user may be able to ask the online system to perform certain tasks using the chatbot. Chatbots are also referred to as conversational assistants, artificial intelligence (AI) assistants, intelligent virtual assistants, virtual agents, and so on.

Artificial intelligence based chatbots may receive user utterances that may be provided as voice signals and use automated speech recognition techniques to recognize the sentences in the user utterances. A chatbot may analyze user utterances using artificial intelligence techniques including machine learning based models, for example, artificial neural networks such as convolutional neural networks, recurrent neural networks, or multi-layer perceptrons. These techniques help the chatbot determine an intent of a user utterance.

Conventional chatbots have limitations, for example, intent detection models have less accurate results for utterances that include negation or coreferences. As a result, a chatbot may interpret negation in sentences incorrectly. For example, if a user requests the system to not perform a task, the system may instead perform the task. Similarly, chatbots may interpret pronouns incorrectly. For example, if the user refers to multiple entities in a conversation and uses a pronoun, chatbots may associate the pronoun with the wrong entity, thereby performing an incorrect task or performing the task with incorrect parameters.

Figure 1:
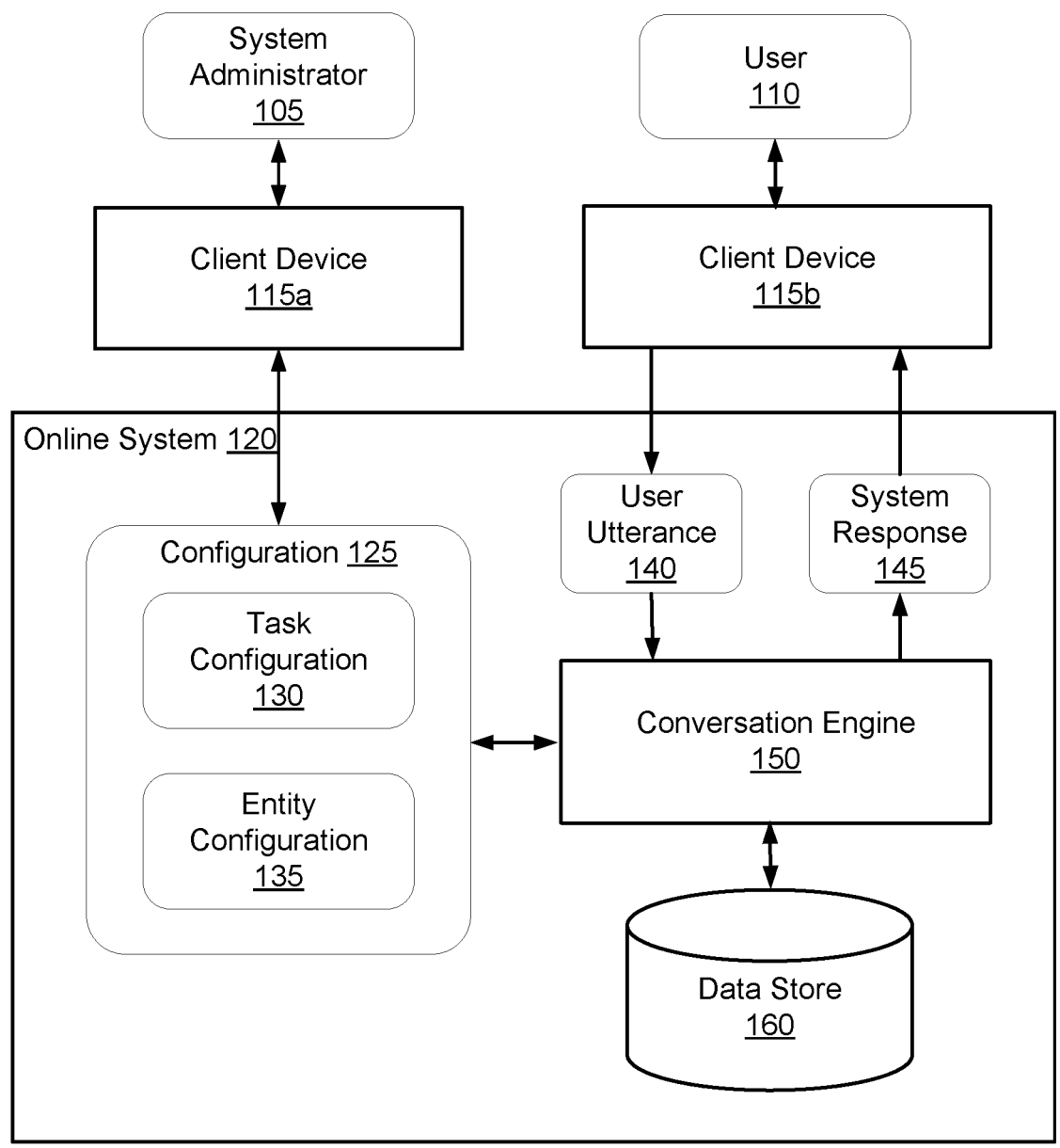
FIG. 1 is a block diagram of a system environment for performing chatbot conversations, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

An online system allows users to perform tasks using customized chatbots. The chatbot may be customized for allowing users to perform a specific set of tasks. The online system receives utterances of users through chatbot conversations and determines the intent in each utterance. The intent corresponding to an utterance determines the task that the user requests the online system to perform. The online system determines accurate intent of chatbot utterances that may include negations, coreferences, or combinations of both.

In an embodiment, the online system is a multi-tenant system that hosts data and services for multiple tenants. Each tenant of the multi-tenant system may represent an enterprise that performs a specific set of tasks for users. Each tenant may customize a chatbot for execution by the multi-tenant system and use by users of the tenant.

The online system performs the following process to determine intent of utterances including negation. The online system receives an utterance representing a natural language sentence with a negation. The online system uses an intent detection model to predict an intent of the natural language sentence. In an embodiment, the intent detection model is a neural network that outputs a confidence score for the predicted intent of the natural language sentence. The online system modifies the natural language sentence by removing the negation. The online system predicts the intent of the modified natural language sentence using the intent detection model. Accordingly, the intent detection model determines a confidence score value for the predicted intent of the modified natural language sentence. The online system compares the confidence score for the modified natural language sentence and the confidence score for the natural language sentence. If the online system determines that the confidence score for the modified natural language sentence exceeds the confidence score for the natural language sentence by a threshold value, the online system determines the intent of the natural language sentence to be a negation of the predicted intent of the modified natural language sentence. The online system may generate a sentence in response to the determined intent. The online system sends the generated response to the user in the chatbot conversation. This process is continued while the conversation with the user is performed.

If the online system determines that the confidence score for the modified second natural language sentence does not exceed the confidence score for the second natural language sentence by the threshold value, the online system generates a sentence for confirming the user intent. The online system sends the generated sentence to the user.

In an embodiment, the online system maintains a set of tasks based on the conversation with the user. Each task corresponds to an intent based on a user utterance. If the online system determines that the intent of the natural language sentence is negation of an intent, the system removes the task corresponding to the intent from the set of tasks. The online system proceeds to perform the remaining tasks from the set.

The online system processes utterances with coreferences as follows. A coreference occurs when two or more expressions in a sentence refer to the same entity, for example, a pronoun and a name may refer to the same person or thing. The online system receives an utterance comprising a natural language sentence with a pronoun from a user during a chatbot conversation. The online system predicts the intent of the natural language sentence using the intent detection model. The intent detection model determines a confidence score for the predicted intent of the natural language sentence. The online system modifies the natural language sentence by replacing the pronoun with an entity referenced in the conversation. The online system predicts the intent of the modified natural language sentence using the intent detection model. The online system selects a final intent for the utterance as the predicted intent having the highest confidence score. The online system may generate a sentence based on the final intent and send the generated sentence to the user in the chatbot conversation.

In an embodiment, the online system identifies entities referenced in natural language sentences received from the user during the chatbot conversation. The online system clusters entities referenced in the natural language sentences. The online system identifies a cluster in which the pronoun is present and selects an entity from the cluster for replacing the pronoun.

In an embodiment, a user utterance includes multiple natural language sentences. The online system determines an intent and a confidence score for each natural language sentence in the utterance using the intent detection model. The online system determines whether at least one of the intent determined indicates a value indicating an undefined intent.

If the online system determines that at least one of the intent determined indicates a value that is not undefined, the online system determines the overall intent as the intent with the highest confidence score that is not undefined. If the online system determines that all intents are undefined, the online system determines the overall intent to be the intent with the highest confidence score and confirms with the user, whether the determined intent is correct.

Accordingly, the online system performs chatbot conversations with users and accurately determines intents of user utterances with negation and coreferences.

System Environment

FIG. 1 is a block diagram of a system environment 100 for performing chatbot conversations according to an embodiment. The system environment 100 includes an online system 120 that communicates with users via client devices 115. The online system 120 includes a conversation engine 150 and a data store 160. The online system 120 may include other components not shown in FIG. 1, for example, other types of data stores, external system interfaces, and so on.

The system environment 100 may include other elements not shown in FIG. 1, for example, a network. The online system 120 may be referred to herein as a system.

Users 105, 110 of the online system 120 interact with the online system using client devices 115. Some users may be privileged users, for example, system administrators 105 that maintain and configure the online system 120. Other users 110 simply use the functionality provided by the online system, for example to perform various tasks supported by the online system.

The conversation engine 150 uses chatbots to perform conversations with users 110. The online system 110 allows system administrators 150 to customize the chatbots using a chatbot configuration 125. As shown in FIG. 1, a system administrator 105 may use a client device 115a to provide the chatbot configuration 125 to the online system 120. The chatbot configuration configures and customizes the chatbots used by the conversation engine 150. A chatbot may be customized to allow users to perform a specific set of tasks. An enterprise that performs certain types of transactions may customize the chatbot to allow users to have conversations with the online system 120 to perform tasks related to the transactions, for example, perform authentication, execute a transaction, check status of a transaction, and so on.

In an embodiment, the chatbot configuration 125 includes task configuration 130 and entity configuration 135. The task configuration 130 specifies the tasks that can be performed by users using the chatbot. The entity configuration 135 specifies information describing entities that represent various values that are needed for performing the tasks. For example, to check status of an order, the online system 120 needs the order id or one or more values to identify the order, for example, the date the order was placed, the account used to place the order. These values are referred to as entities mentioned during the conversation. The entity configuration 135 specifies methods for determining values of the entity.

Figure 2:
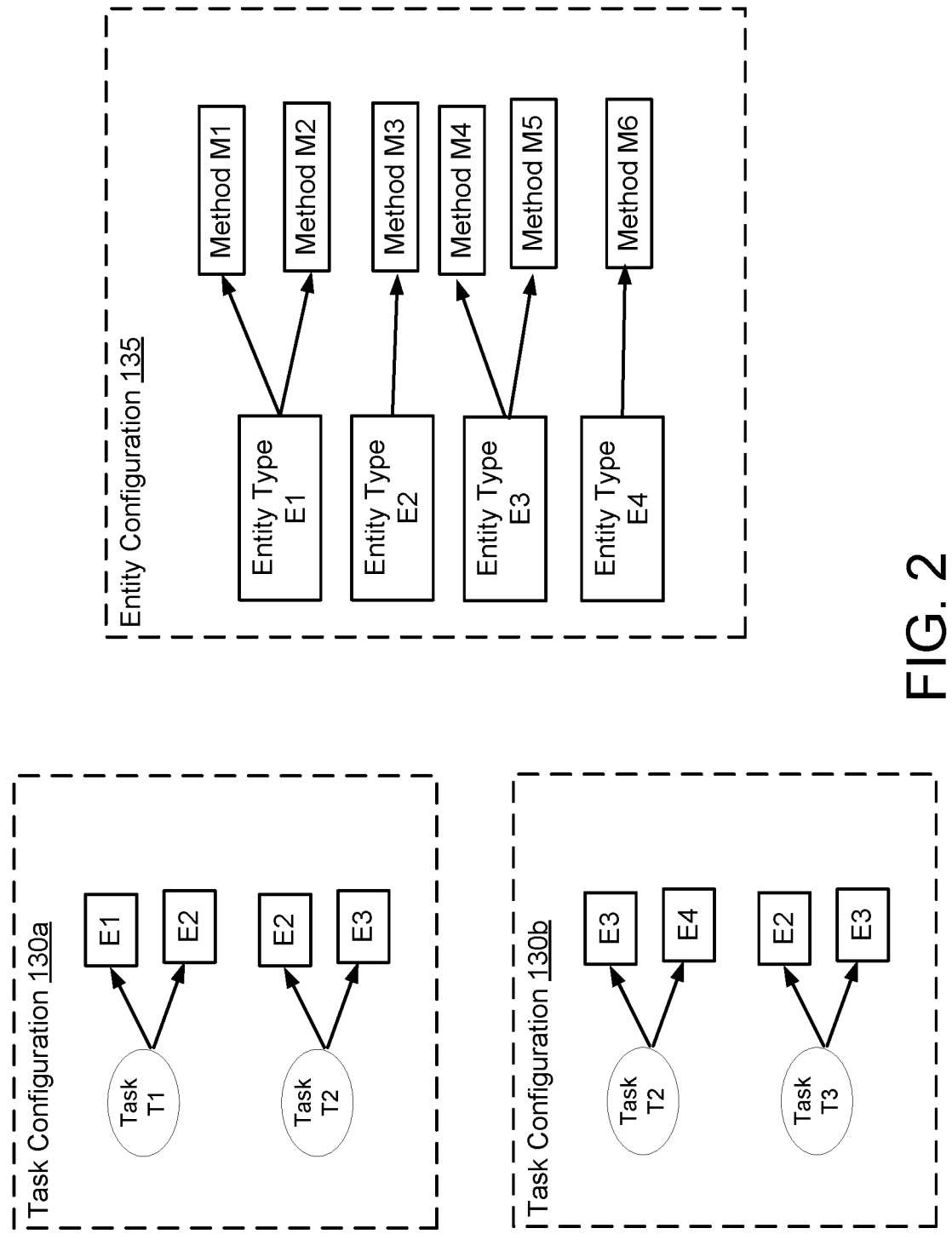
FIG. 2 shows examples of task configurations and entity configurations used for customizing chatbots, according to an embodiment.

FIG. 2 provides an illustrative example of task configurations 130 and entity configuration 135. For each task, the task configuration specifies a set of entities that are relevant for performing the task. The values represented by entities may be provided by the user or may be determined by the conversation engine 150, for example, by accessing the data store 160 or by invoking certain services, for example, web services. For example, if the task represents retrieving the status of an order, the entities relevant to the task include the order ID and the status of the order itself. The conversation engine 150 may obtain the order ID from the user, for example, by generating a question to request the order ID or requesting information such as date of the order that can be used to access the order ID. The conversation engine 150 may access the order status from the data store 160 and provide the order status information to the user.

The conversation engine 150 performs conversations with users 110 according to the configuration 125. The conversation engine 150 receives user utterances 140 and performs tasks based on the user utterances. The conversation engine 150 may interact with the data store 160 to perform the task, for example, to access information stored in the data store 160 or to update information stored in the data store 160. The conversation engine 150 may generate a system response 145 and provide to the user. The system response 145 may be sent to the user to request additional information required to perform the task. The system response 145 may inform the user that the task is completed or provide the user with requested information.

In some embodiments, the online system 120 is a multi-tenant system that allows multiple tenants to use the system, each tenant representing a group of users. The term tenant refers to an organization or enterprise that is a customer of the multi-tenant system. As an example, a tenant may be a company that employs sales people that use the multi-tenant system to manage their sales processes. The term tenant can refer to the set of users of the entire organization that is the customer of the multi-tenant system or to a subset of users of the organization. Accordingly, embodiments allow tenant-specific chatbots that may be customized for a set of users, for example, the entire set of users of the organization, a specific group of users within the organization, or an individual user within the organization. The multi-tenant system stores data of multiple tenants and allows tenants to share applications running on the multi-tenant system. The multi-tenant system may run various applications that tenants are allowed to execute.

The data store 160 stores data for users of the online system 120. A multi-tenant system may store data for multiple tenants in the same physical data store, for example, data store 160 but enforce a logical separation of data across tenants. As a result, one tenant does not have access to another tenant's data, unless such data is expressly shared. The data store 160 may be implemented as a relational database storing one or more tables.

The online system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the online system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

FIG. 2 shows examples of task configurations and entity configurations used for customizing chatbots, according to an embodiment. In an embodiment, the online system 120 presents a user interface for a system administrator to provide information that may be stored in a configuration file storing the task configurations and entity configurations. As shown in FIG. 2, multiple task configurations 130 may be specified, each task configuration file for a specific chatbot customized for a set of tasks. For example, the task configuration 130a specifies configurations for tasks T1 and T2, whereas task configuration 130b specifies configurations for tasks T2 and T3.

Each task configuration specifies among other details, the entities relevant to performing the task. For example, as specified in task configuration 130a task T1 uses entities E1 and E2, whereas task T2 uses entities E2 and E3. The specification of a task in two different configuration files may be different. Accordingly, different entities may be specified as being associated with the same task in two different task configurations. For example, task configuration 130b specifies that task T2 uses entities E3 and E4 whereas configuration 130b specifies that task T2 uses entities E2 and E3.

The entity configuration 135 specifies methods for different entity types. For example, entity configuration 135 specifies entity types E1, E2, E3, and E4. Furthermore, entity configuration 135 specifies methods M1 and M2 for processing entity type E1, method M3 for processing entity type E2, methods M4 and M5 for processing entity type E3, and method M6 for processing entity type E4. In an embodiment, an entity configuration be specified independent of task configurations. Accordingly, the entity configuration will be used independent of the task configuration used by a chatbot. In other embodiment, an entity configuration may be specific to a task configuration. Accordingly, the entity configuration is used whenever a chatbot is using the corresponding task configuration. In an embodiment, the system may use a combination of task specific entity configurations and task independent configurations. For example, some entity types may be specified independent of task configurations and some entity types specified for specific task configurations.

In an embodiment, the same entity type may have one configuration in a task independent entity configuration and another configuration in a task specific entity configuration. The task specific entity configuration identifies a specific task for which the entity configuration is specified, for example, the task specific entity configuration may specify an entity configuration for entity type E1 for task T1. The task specific entity configuration is used if a chatbot is using that task, for example, task T1. The same entity type may be used for other tasks, for example, task T2 and T3. For chatbots using task configurations specify other tasks such as tasks T2 and T3, the entity specification from the task independent entity configuration is used.

Following is an example of a task configuration that specifies a task check order. Although following example shows only one task, a task configuration may specify any number of tasks.

```
check_order:
    description: check your order status
    samples:
        I have not received the ordered item yet
        The ordered item has not yet delivered
        is my ordered item on the way?
        i want to check order
        my order status
    entity_types:
        E1:
            order_status
        E2:
            oid
    success:
        AND:
            TASK:
                verify_user
            INFO:
                E1
            QUERY:
                E2
```

The configuration of the task includes a description, one or more samples, one or more entity types, and a success criterion. The samples specify examples of natural language sentences that may be used by a user requesting that particular task. The entity types identify entities that are relevant to that task. The success criterion may be a logical expression that specifies the processing that needs to be performed to successfully complete the task. The processing may specify certain entity actions that need to be performed to successfully complete the task. If the expression describing success of the task is an OR operation performed on entity actions associated with entities E1 and E2, the task is completed if either E1 or E2 is evaluated successfully by performing their corresponding entity actions. Accordingly, an OR expression evaluates successfully if any one of the sub-expressions of the OR expression evaluates successfully. An AND expression evaluates successfully if all sub-expressions of the AND expression evaluate successfully indicating the user verified that part of authentication successfully.

The online system supports a set of entity actions that can be specified in the task configuration. For example, the task configuration may specify an entity action INFO specifying that the online system provides the entity information. The entity action QUERY specifies that the online system will search entity based on information that the user provided. Similarly, the entity action INSERT specifies that the online system will insert a record based on information provided by user. The entity action DELETE specifies that the online system will delete a record identified based on information provided by user. The entity action UPDATE specifies that the online system will update a record identified based on information provided by the user. Similarly, the system may support other actions. A user may define an entity function, for example, using a function or method specified using a programming language.

Following is an example of an entity configuration file. This is a task specific entity configuration that is used while performing a task, for example, verify user task. The entity configuration specifies two entity types email_address and zip_code. For each entity type, the entity configuration specifies the value of the type of the entity, one or more methods associated with the entity, and a confirm flag. The confirm flag specifies whether the system should confirm with the user if the value determined for the entity is correct. For example, the conversation engine may ask a question such as "Do you mean the email address is abc@email.com?" For entity type email_address, the type specified is "email", a single method "spelling" is specified, and the confirm flag has value "yes". For entity type zip_code, there are four methods specified, named entity recognition (ner), spelling, regular expression (regex), and fuzzy matching. Details of these methods are further described herein.

```
verify_user:
    email_address:
        type:
            EMAIL
        method:
            SPELLING
        confirm: yes
    zip_code:
        type:
            CARDINAL
        methods:
            ner:
            spelling:
            regex:\d{5}
            fuzzy_matching:
                94301
                94305
        hints:
            type:
                INT
            other_parameters:
                address
                ner
        prompt:
            Could you please provide your zipcode?
```

```
        confirm: yes
        function: funcGetWeather
        response:
```

In some embodiments, the task configuration specifies a user defined entity function. The user defined entity function may be specified using a language, for example, a programming language such as PYTHON. For example, the above example task configuration specifies a function funcGetWeather that checks weather for the zip code corresponding to the entity zip_code. The function funcGetWeather may include instructions to interact with a web service that provides weather information. The function funcGetWeather can be invoked by the conversation engine during a conversation with a user to provide weather condition for a particular zip code.

In an embodiment, the entity configuration specifies a "response" attribute that defines the response provided by the conversation engine to the user during a conversation. The response is provided by the conversation engine after the online system processes the entity that specifies the "response" attribute. In an embodiment, the "response" attribute specifies a template that includes a value associated with the entity. For example, the "response" attribute for the example "zip_code" entity show above may specify that the output of the funcGetWeather is appended to a string "The weather currently is" and provide to the user in response to the user question. Accordingly, the "response" attribute allows a user to customize a response associated with an entity. If the entity configuration does not specify a "response" attribute, the conversation engine may use a default response, for example, a statement such as the string "The value is" appended to the entity value. Similarly, the attribute "prompt" allows the user to customize the prompt that is presented to the user when the conversation engine requests a value from the user instead of using a default prompt.

The instructions for each method may be stored in a file and accessed for processing the entity. The system may perform certain checks associated with the type of the entity type to make sure that the value determined conforms to the type. For example, the type EMAIL may specify a specific format.

System Architecture

Figure 3:
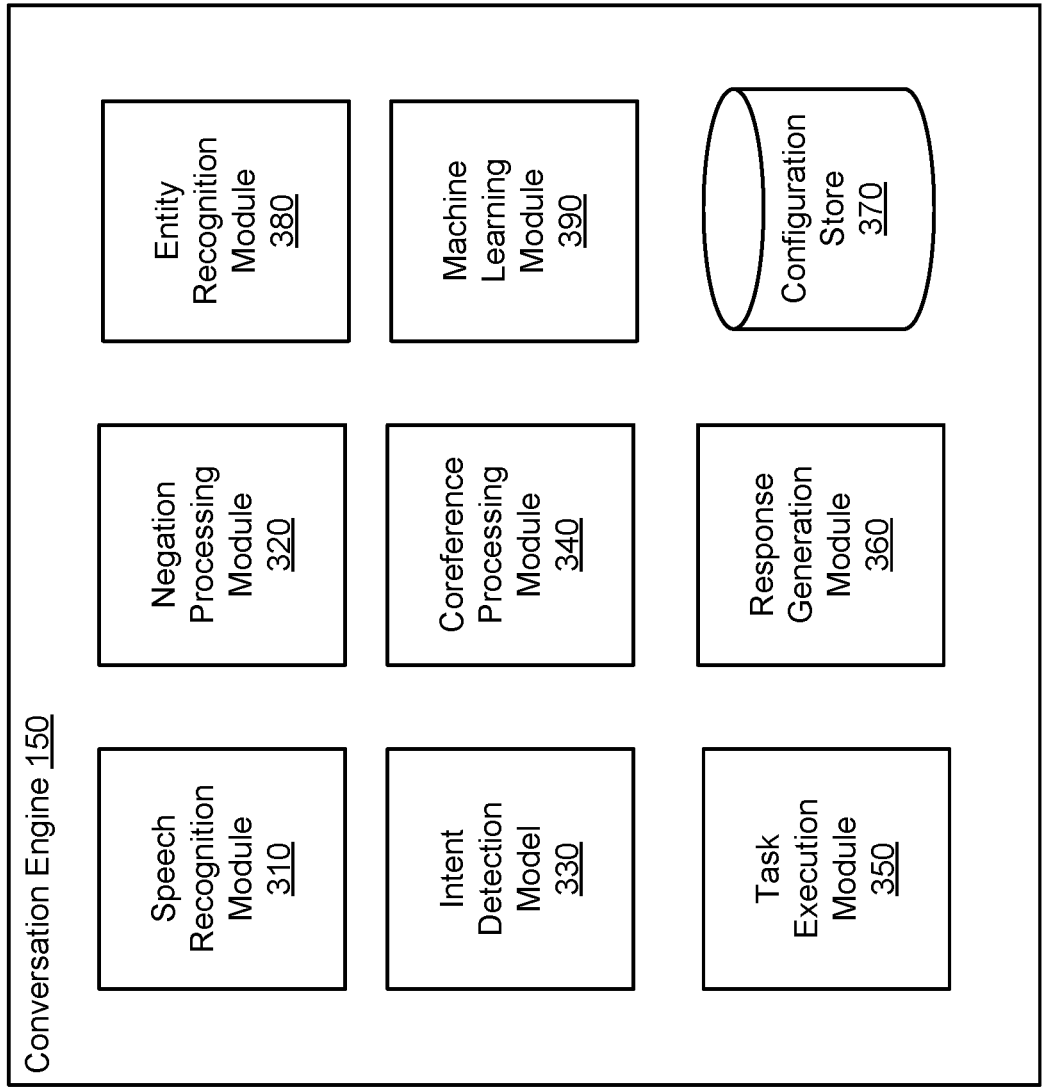
FIG. 3 is a block diagram of a system architecture of a conversation engine, according to an embodiment.

FIG. 3 is a block diagram of a system architecture of a conversation engine, according to an embodiment. The online system 120 comprises a speech recognition module 310, a negation processing module 320, an intent detection model 330, a coreference processing module 340, a task execution module 350, a response generation module 360, a configuration store 370, and an entity recognition module 380. Other embodiments can have different and/or other components than the ones described here. Furthermore, the functionalities described herein can be distributed among the components in a different manner.

The online system allows users to customize chatbots by specifying chatbot configurations. The chatbot configurations are stored in the configuration store 370. A chatbot configuration may be received as a configuration file, for example, an XML, or a YML file.

The conversation engine 150 allows users to perform tasks using the online system 120. For example, if the online system implements an e-commerce website, the conversation engine 120 to allow users to perform tasks related to transactions, for example, execute an online transaction, check status of a transaction, and so on. The tasks are performed by the task execution module 350. The task execution module 350 may interact with other components, for example, with the data store 160 to access data or update data necessary for executing a task. The task execution module 350 may interact with external services, for example, a mapping service to confirm an address.

In an embodiment, the task execution module 350 maintains a data structure storing a set of tasks. For example, the data structure may be a queue data structure or a stack data structure. If the task execution module 350 needs to execute a task, the task execution module 350 stores a task object on the data structure. The task object specifies a type of task and slots for storing various entities required for executing the task. The task execution module 350 obtains a task from the task data structure and processes it. The task configuration may specify that performing a task requires execution of other related tasks. For example, to perform a task representing executing a transaction, the system needs to perform a task representing authentication of the user before executing the transaction. Accordingly, for executing a task, the task execution module 350 may add other tasks to the task data structure. The task execution module 350 keeps processing tasks on the task data structure until all tasks are executed.

The conversation engine 150 performs natural language conversations with users. The conversation engine 150 receives utterances from users. The utterances may be provided as text signals via a user interface that allows users to input text. The utterances may be provided as voice signals via a user interface that allows users to speak into a microphone that captures the voice signal. The conversation engine 150 may ask questions to users for receiving information and receives natural language answers from users. The conversation engine 150 generates dialogs that are presented to the user. The conversation engine tracks state of a conversation to make sure that various questions are answered. The conversation engine 150 provides the answers received from users to various other modules. If the user is using a voice based interface for the conversation, the conversation engine 150 uses the speech recognition module 210 to convert the audio signal received to text for further processing.

The speech recognition module 310 receives audio signal as input and converts the audio signal into text for further processing. The speech recognition module 310 allows a user to use voice for conducting conversations with the online system 320. The output of the speech recognition module 310 is provided as input to other modules of the online system 120. In an embodiment, the speech recognition module 310 provides a confidence level for a word that is recognized indicating a likelihood that the word was transcribed correctly.

The entity recognition module 380 identifies an entity that is related to a permitted action that is requested by a user. An entity refers to a value that the system determines to execute a task. For example, to execute a task for verifying a user, the system may determine one or more of, a name of the user, a zip_code of the user, an email of the user, and so on. To retrieve a record of a transaction, the system may need information to uniquely identify the record, for example, a date and time stamp associated with the transaction, a record identifier, and so on. The task configurations specify the types of entities that are required to perform a task.

The entity recognition module 380 may execute different methods for recognizing an entity of an entity type, as specified in the entity configuration. For example, in the above example configuration of zip_code entity type, four methods are specified, named entity recognition, spelling, regular expression, and fuzzy matching.

The entity recognition module 380 performs named entity recognition by providing the sentence to a named entity recognition model that receives a sentence as input and identifies one or more named entities and their types. Named entities are entities that are associated with a set of pre-defined categories, for example, person names, organizations, locations, time expressions, quantities, monetary values, percentages, and so on. In an embodiment, the named entity recognition model is a neural network that is trained using sentences with known named entities. As an example, for an example, input sentence "I want a television to be delivered to San Jose by end of the week" the named entity recognition model recognizes the following categories of named entities and their values: category product, value "television"; category time, value "end of week"; and category location, value "San Jose."

The entity recognition module 380 executes the spelling method for entity recognition by providing the spelling to the user of the entity and asking the user to confirm or by asking the user to spell out the entity. The entity recognition module 380 executes the regular expression method for entity recognition by matching various portions of the input sentence against regular expressions specified in the entity configuration and selecting a portion of the sentence that matches the regular expression. The entity recognition module 380 executes the fuzzy matching method for entity recognition by performing a fuzzy match of portions of the input sentence against sample expressions specified in the entity configuration. If a portion of the sentence is determined to have a high degree of match with an example based on a fuzzy match, the entity recognition module 380 determines that the portion of sentence is of the entity type for which the method was specified in the entity configuration.

According to an embodiment, the neural network is configured to receive as input a natural language sentence and an example phrase and determine whether the example phrase can be inferred from the natural language sentence. An example phrase can be inferred from a natural language sentence if the natural language sentence implies the example phrase. The example phrase may be another natural language sentence or a portion of a natural language sentence.

In an embodiment, the neural network generates a confidence score indicating a measure of confidence that the example phrase can be inferred from the natural language request. For example, a higher measure of confidence indicates a higher likelihood that the example phrase can be inferred from the natural language request. Given two example phrases, the scores generated by the neural network for a natural language sentence can be compared to determine which example phrase reflects the intent of the natural language request better. Furthermore, given a set of example phrases, the neural network can be executed using pairs of the natural language sentence and example phrases from the set as input to generate scores. The scores can be compared to determine the beast matching example phrase that represents the intent of the natural language sentence. The neural network may be trained using labelled training data set storing pairs of natural language sentences and example phrases that can be inferred from them.

The machine learning module 390 trains the intent detection model 330. In an embodiment, the machine learning module 390 trains the intent detection model 330 using labeled data set comprising several pairs of natural language requests and corresponding example phrases. The example phrases corresponding to an intent may be specified in a task configuration 130 provided by a system administrator.

The negation processing module 320 processes natural language sentences that include negations. The coreference processing module 340 processes natural language sentences that include coreferences, i.e., pronouns that refer to other entities mentioned in the conversation. The negation processing module 320 and coreference processing module 340 execute the various processes described herein, for example, in FIGS. 4-8.

Processes for Determining Intent

Various processes related to determination of intent in utterances provided by users in a chatbot conversation are illustrated in FIGS. 4-8. Other embodiments can perform the steps of these flowcharts in different orders. Furthermore, various embodiments can include different and/or additional steps than the ones described herein.

Figure 4:
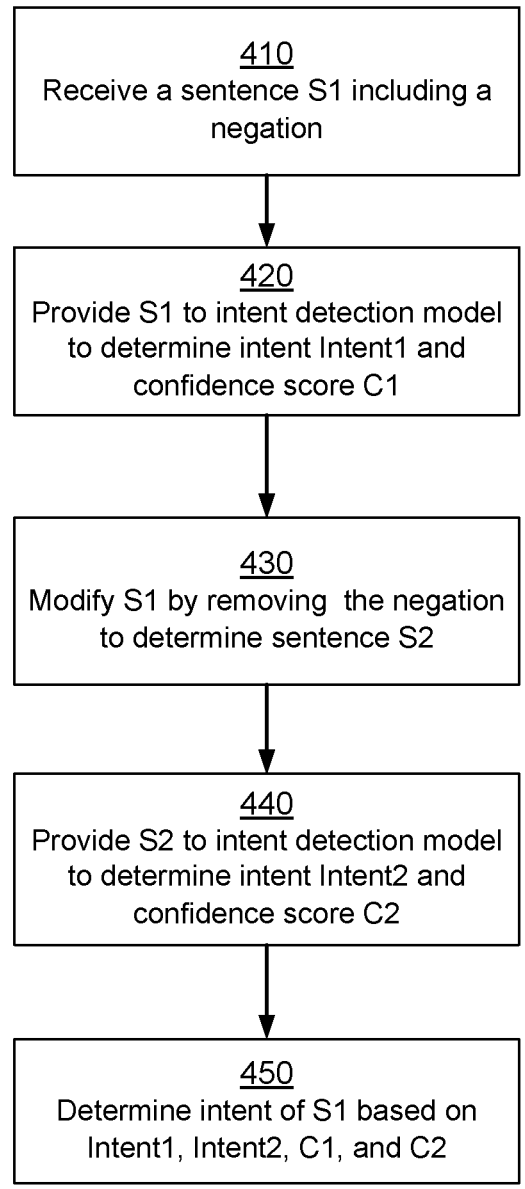
FIG. 4 is a flow chart illustrating the overall process of processing user utterances with negation, according to an embodiment.

FIG. 4 is a flow chart illustrating the overall process of processing user utterances with negation, according to an embodiment. The conversation engine 150 receives 410 an utterance from the user in a chatbot conversation. The utterance includes a sentence S1 with negation. In an embodiment, the conversation engine 150 determines that the sentence has negation by parsing the sentence and looking for presence of specific keywords, for example, "not", "do not", "don't", and so on.

The conversation engine 150 provides 420 the sentence S1 to the intent detection model 330. The intent detection model 330 predicts an intent Intent1 for the sentence S1 and a confidence score C1 that represents the confidence in the predicted result.

The conversation engine 150 modifies 430 the sentence by removing the negation to generate a sentence S2. For example, if the conversation engine 150 determines that the sentence S1 includes a keyword "not", the conversation engine 150 may remove the keyword "not" from sentence S1 and leave the remaining keywords as they are. As a result, S2 represents a sentence that corresponds to sentence S1 but without the negation of sentence S1.

The conversation engine 150 provides 440 the sentence S2 to the intent detection model 330. The intent detection model 330 predicts an intent Intent2 for the sentence S2 and a confidence score C2 that represents the confidence in the predicted result.

The conversation engine 150 determines 450 the intent of the sentence S1 based on the values of Intent1, Intent2, C1 and C2 as illustrated in the flowchart shown in FIG. 5 and described in connection with FIG. 5.

Figure 5:
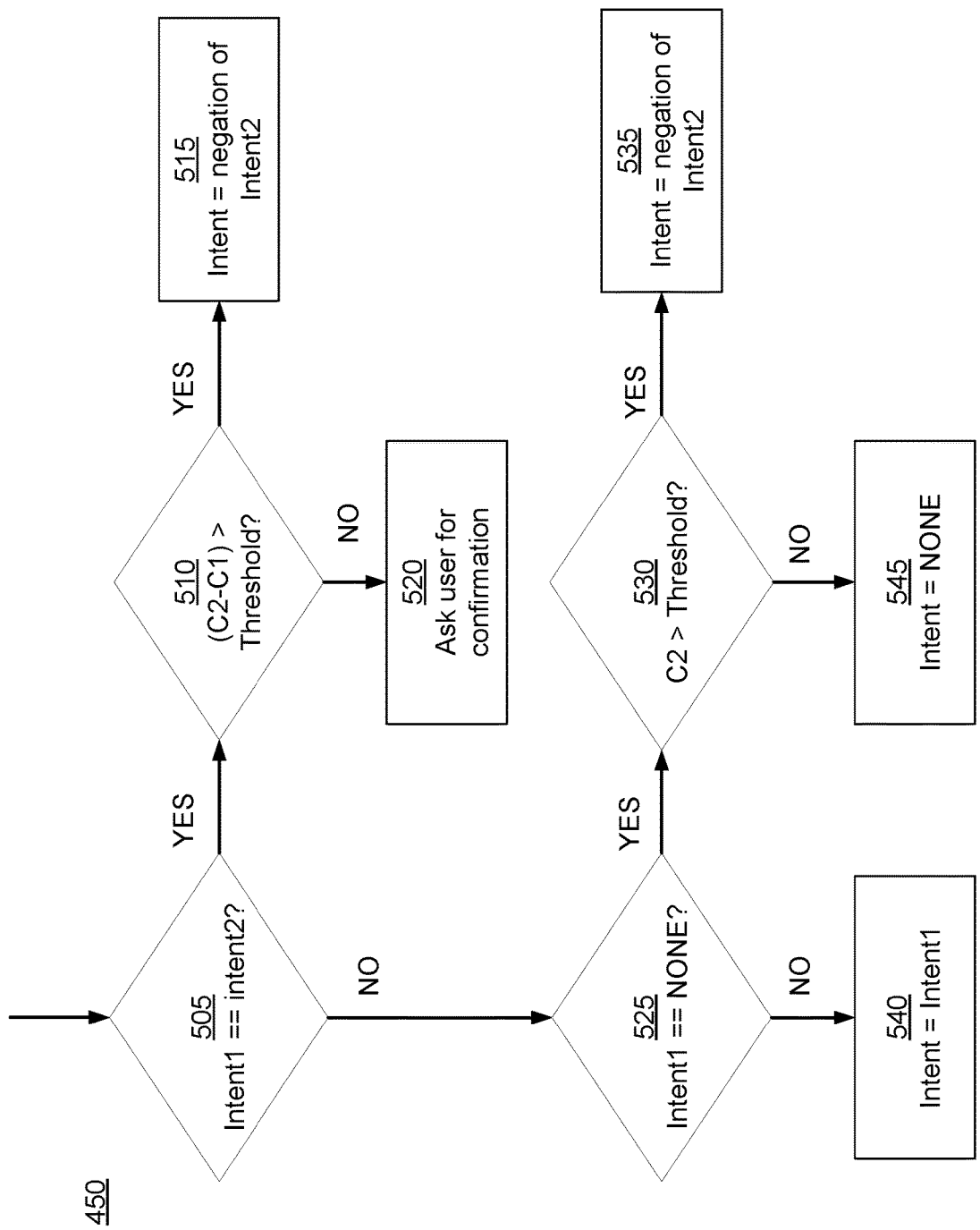
FIG. 5 is a flow chart illustrating the process of determining intent of a user utterance based on confidence score determined by the intent detection model, according to an embodiment.

FIG. 5 is a flow chart illustrating the process of determining intent of a user utterance based on confidence score determined by the intent detection model, according to an embodiment. The flowchart of FIG. 5 illustrates an embodiment of the step 450 that determines 450 the intent of the sentence S1 based on the values of Intent1, Intent2, C1 and C2.

The conversation engine 150 receives the values of Intent1 representing an intent of a sentence S1, Intent2 representing an intent of a sentence S2 obtained by modifying sentence S1, C1 and C2 representing the confidence scores associated with intents Intent1 and Intent2 respectively. The intents and confidence score values are determined by processing the respective sentences using the intent detection model 330. The conversation engine 150 checks 505 if the two intent values Intent1 and Intent2 are same, i.e., whether Intent1==Intent2. If the conversation engine 150 determines that the two intent values Intent1 and Intent2 are same, i.e., the predicted intent of the sentence S1 and the modified sentence S2 are same, the conversation engine 150 checks 510 if the difference between the two confidence score values (C2−C1) is greater than a predefined negation threshold value. If, the conversation engine 150 determines that (C2−C1) is greater than the negation threshold value, the conversation engine 150 determines that the intent of the sentence S1 is Intent2, i.e., intent of the modified sentence S2, which is same as Intent1 the intent of the sentence S1. If, the conversation engine 150 determines that (C2−C1) is not greater than the negation threshold value, the conversation engine 150 generates a sentence for asking 520 the user to confirm the intent. For example, if the intent matches a task, the conversation engine 150 generates a question by concatenating "Do you want to" to a string describing the task and sends the generated question to the user via the chatbot as part of the conversation.

If the conversation engine 150 determines that the two intent values Intent1 and Intent2 are not equal, the conversation engine 150 checks 525 whether Intent1 is none, i.e., whether the intent determination model 330 could not determine any intent for the sentence S1 and therefore returned none as the result. If the intent determination model 330 is unable to determine any intent for a sentence and returns none as the result, the intent determination model 330 returns zero as the value of confidence score, i.e., a value that indicates very low confidence in the result. If the conversation engine 150 determines that the two intent values Intent1 and Intent2 are not equal and Intent1 is none, the conversation engine 150 compares C2 with the negation threshold to determine 530 whether C2 is greater than the negation threshold. If the conversation engine 150 determines that C2 is greater than the negation threshold, the conversation engine 150 obtains 535 the intent of sentence S1 by performing negation of Intent2, i.e., negation of sentence S2. If the conversation engine 150 determines that C2 is not greater than the negation threshold, the conversation engine 150 determines that the intent of the sentence S1 is none and may ask the user to confirm the intent as described above for step 520.

If the conversation engine 150 determines 525 that the value of Intent1 is not none and also Intent1 and Intent2 are not identical, the conversation engine 150 determines the intent of sentence S1 to be Intent1.

The conversation engine 150 proceeds to take an action based on the determined intent. More specifically, if the conversation engine 150 determines that the intent of a sentence represents negation of an intent that represents a task, the conversation engine 150 determines that the user does not want to perform a task that the user may have requested the system to perform. For example, the conversation engine 150 may have stored one or more tasks in a task queue based on an ongoing conversation. If the conversation engine 150 determines that the user provided an utterance including a sentence representing a negation of one of the tasks, the conversation engine 150 removes the task from the task queue and proceeds to perform the remaining tasks on the task queue. If the task removed was the only task that was currently pending, the conversation engine 150 may generate a sentence requesting the user for further information on what the user wants, for example, "How can I further assist you?" or "Can I further help you?"

Figure 6:
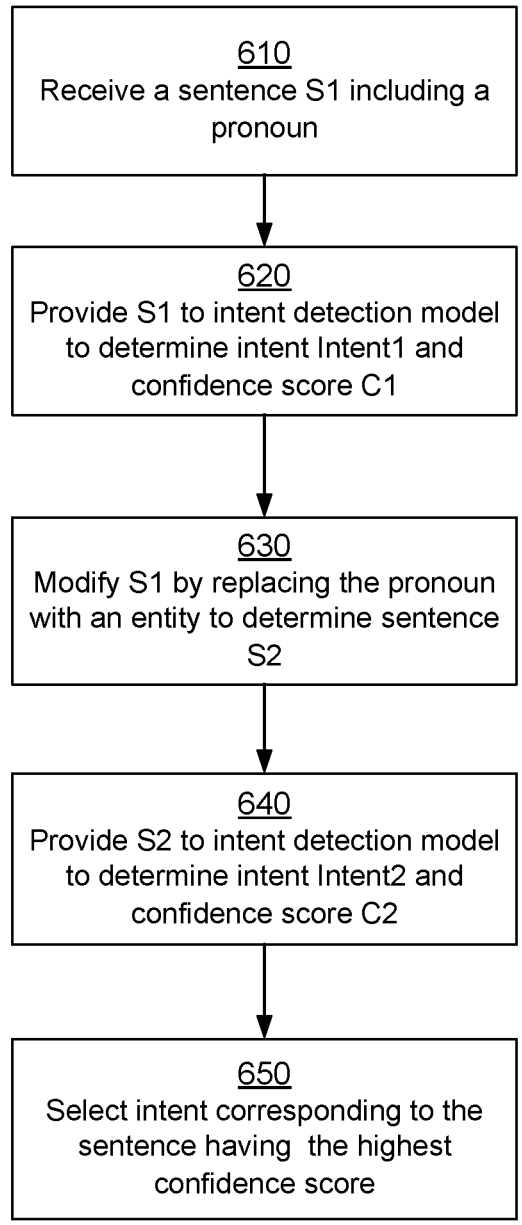
FIG. 6 is a flow chart illustrating the process of processing user utterances with coreferences, according to an embodiment.

FIG. 6 is a flow chart illustrating the process of processing user utterances with coreferences, according to an embodiment. The conversation engine 150 receives 610 an utterance from the user in a chatbot conversation. The utterance includes a sentence S1 with a pronoun. In an embodiment, the conversation engine 150 determines that the sentence has pronoun by parsing the sentence and looking for presence of specific keywords, for example, "he", "she", "it", and so on.

The conversation engine 150 provides 620 the sentence S1 to the intent detection model 330. The intent detection model 330 predicts an intent Intent1 for the sentence S1 and a confidence score C1 that represents the confidence in the predicted result.

The conversation engine 150 modifies 630 the sentence by replacing the pronoun with an entity referenced during the conversation to generate a sentence S2. In an embodiment, the conversation engine 150 tracks the various entities referenced in a conversation. For example, the conversation engine 150 may receive an utterance "I ordered a washer. When will it get shipped?" This utterance includes at least two entities, "washer" and "it". The conversation engine 150 may modify the sentence "When will it get shipped" by replacing the pronoun "it" with the entity "washer" mentioned in the conversation. Accordingly, S2 represents a sentence that corresponds to sentence S1 with a pronoun replaced by an entity corresponding to the pronoun.

In an embodiment, the conversation engine 150 clusters the entities referenced during a conversation to determine a set of clusters, each cluster including related entities. An entity may be referenced by a pronoun, a noun, or used without a specific name. The conversation engine 150 identifies the cluster in which a pronoun is included and replaces the pronoun in sentence S1 with other entities of the cluster to obtain modified sentences similar to sentence S2.

The conversation engine 150 provides 640 the sentence S2 to the intent detection model 330. The intent detection model 330 predicts an intent Intent2 for the sentence S2 and a confidence score C2 that represents the confidence in the predicted result.

The conversation engine 150 selects 650 the intent of the sentence S1 as the intent that has highest confidence score. For example, the conversation engine 150 selects the intent to be Intent1 if the conversation engine 150 determines that C1>C2 and the conversation engine 150 selects the intent Intent2 if the conversation engine 150 determines that C2>C1.

It is possible that there are multiple entities corresponding to the pronoun. For example, there may be three entities E1, E2, and E3 corresponding to the pronoun. The conversation engine 150 generates multiple sentences, each sentence generated by replacing the pronoun with one of the entities. For example, the conversation engine 150 may generate a sentence S11 by replacing the pronoun with entity E1, sentence S12 by replacing the pronoun with entity E2, and sentence S13 by replacing the pronoun with entity E3. The conversation engine 150 provides each of these sentences to the intent detection model 330. The conversation engine 150 obtains Intent11 and confidence score C11 by providing sentence S11 to the intent detection model 330, Intent12 and confidence score C12 by providing sentence S12 to the intent detection model 330, and Intent13 and confidence score C13 by providing sentence S13 to the intent detection model 330. The conversation engine 150 compares the different confidence scores and selects the intent corresponding to the sentence that resulted in the highest confidence score. For example, if C12 is greater than C11 and C13, the conversation engine 150 selects Intent12 as the intent.

A user utterance may include sentence or sentences that include coreferences as well as negation. Accordingly, the sentence may include one or more pronouns as well as negation. For example, during a chatbot conversation, a user may state, "I ordered a washer. I would like to return it." Accordingly, the conversation engine performs a process that combines the techniques of flowcharts in FIGS. 4-6 to determine the intent of the user utterance.

Figure 7:
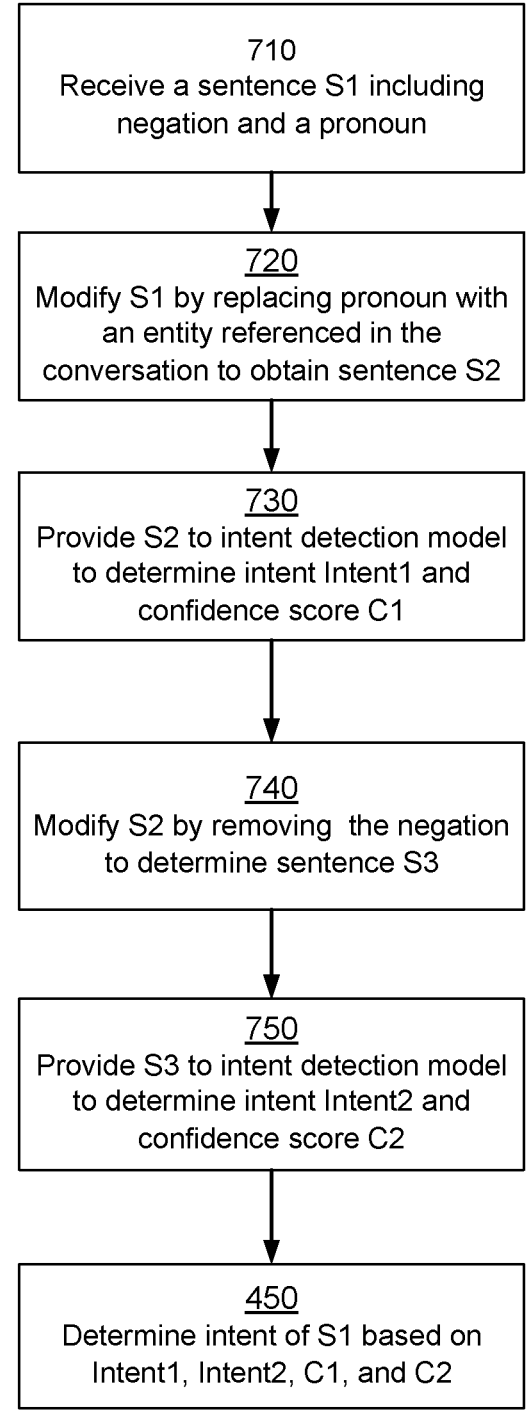
FIG. 7 is a flow chart illustrating the process of processing user utterances with negation and coreferences, according to an embodiment.

FIG. 7 is a flow chart illustrating the process of processing user utterances with negation and coreferences, according to an embodiment. The conversation engine 150 receives 710 an utterance from the user in a chatbot conversation. The utterance includes a sentence S1 with a pronoun as well as a negation.

The conversation engine 150 determines an entity referenced in the conversation. The conversation engine 150 determines that the entity is associated with the pronoun, for example, by clustering the entities referenced in the conversation and determining that the entity is in the same cluster as the pronoun. The conversation engine 150 modifies 720 the sentence S1 to obtain a sentence S2 by replacing the pronoun with the entity referenced in the conversation.

The conversation engine 150 provides 730 the sentence S2 to the intent detection model 330. The intent detection model 330 predicts an intent Intent1 for the sentence S2 and a confidence score C1 that represents the confidence in the predicted result.

The conversation engine 150 modifies 740 the sentence S2 by removing the negation to generate a sentence S3. As a result, S3 represents a sentence that corresponds to sentence S1 with the pronoun replaced by an entity and the negation removed.

The conversation engine 150 provides 750 the sentence S3 to the intent detection model 330. The intent detection model 330 predicts an intent Intent2 for the sentence S3 and a confidence score C2 that represents the confidence in the predicted result.

The conversation engine 150 determines 450 the intent of the sentence S1 based on the values of Intent1, Intent2, C1 and C2. This step corresponds to the step 450 of the process illustrated in FIG. 4 and illustrated in the flowchart shown in FIG. 5 and described in connection with FIG. 5.

Figure 8:
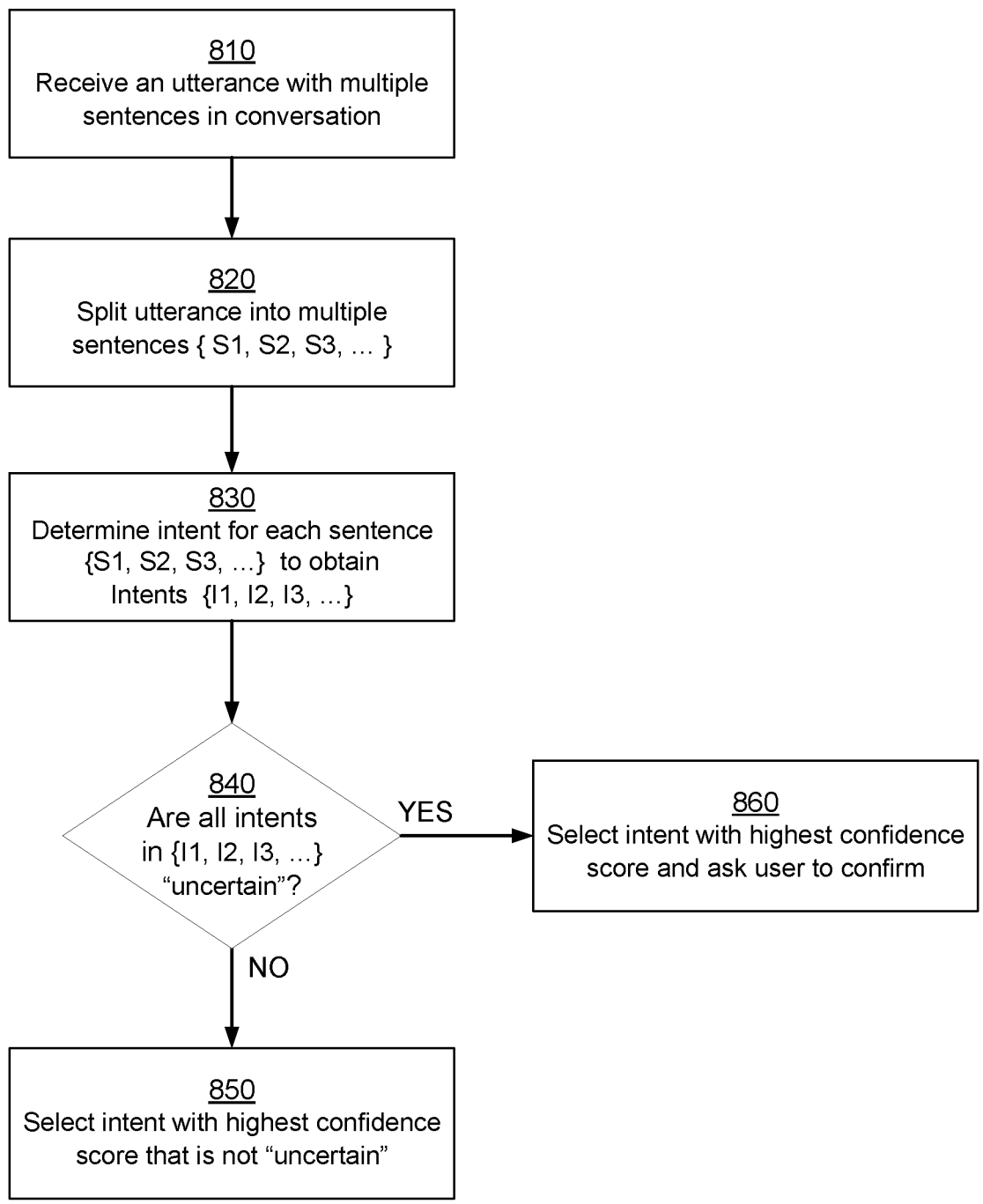
FIG. 8 is a flow chart illustrating the process of processing user utterances with multiple sentences, according to an embodiment.

FIG. 8 is a flow chart illustrating the process of processing user utterances with multiple sentences, according to an embodiment. The conversation engine 150 receives an utterance in a chatbot conversation. The utterance includes multiple sentences. The conversation engine 150 splits the utterance into a set of sentences, for example, {S1, S2, S3, . . . }. The conversation engine 150 provides each of the sentences in the set of sentences to the intent detection model to determine 830 the corresponding intents. For example, the conversation engine 150 determines a set of intents {I1, I2, I3, . . . }, each intent Ix corresponding to a sentence Sx from set {S1, S2, S3, . . . }. The intents determined correspond to confidence scores {C1, C2, C3, . . . } such that confidence score Cx corresponds to intent Ix determined from sentence Sx. An intent Ix may be determined to be "uncertain" which is a value indicating that intent is undefined since the intent detection model 330 could not determine an intent for the sentence with a reasonable confidence score. Accordingly, the confidence score was below a minimum threshold value. The conversation engine 150 may assign a confidence score of zero to these intent values.

The conversation engine 150 checks 840 whether all intents in the set of intents are 'uncertain' or whether some of the intents have valid intent values. If there are one or more intent values in the set of intents that are not 'uncertain', the conversation engine 150 selects 850 the intent that is not 'uncertain', and has the highest confidence score. If all intent values in the set of intents are 'uncertain', the conversation engine 150 may select 860 the intent that has the highest confidence score and then ask the user for confirmation, requesting the user to confirm whether the determined intent is correct.

Computer Architecture

Figure 9:
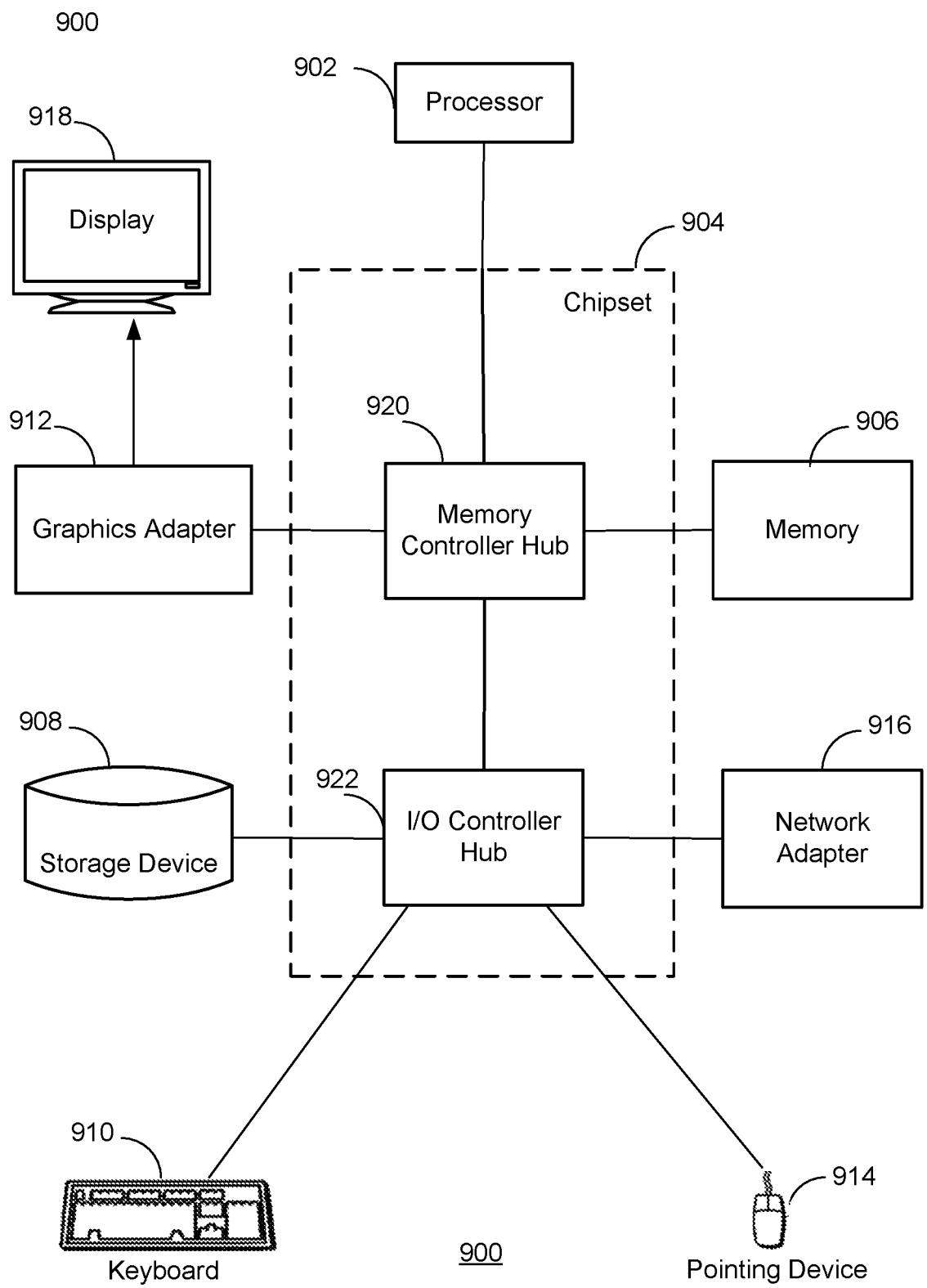
FIG. 9 is a block diagram illustrating a functional view of a typical computer system according to one embodiment.

FIG. 9 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as an online system 120 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of FIG. 1 can vary depending upon the embodiment and the processing power used by the entity. For example, a client device 115 may be a mobile phone with limited processing power, a small display 918, and may lack a pointing device 914. The online system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A computer implemented method for determining intent of a user in a chatbot conversation, the method comprising:
   receiving, by an online system, a natural language sentence from the user during the chatbot conversation, wherein the natural language sentence includes a negation;
   predicting an intent of the natural language sentence using an intent detection model, the intent detection model determining a confidence score for the predicted intent of the natural language sentence;
   modifying the natural language sentence by removing the negation;
   predicting an intent of the modified natural language sentence using the intent detection model, the intent detection model determining a confidence score for the predicted intent of the modified natural language sentence;
   responsive to the confidence score for the predicted intent of the modified natural language sentence exceeding the confidence score for the predicted intent of the natural language sentence by a threshold value, determining a final intent of the natural language sentence to be a negation of the predicted intent of the modified natural language sentence;
   generating a sentence in response to the final intent; and
   sending the generated sentence to the user in the chatbot conversation.

2. The method of claim 1, wherein the intent detection model comprises a neural network configured to receive an input sentence and an example sentence and output a score based on a match between the input sentence and the example sentence.

3. The method of claim 2, wherein the chatbot conversation is performed using a chatbot, the method further comprising:
   receiving a chatbot configuration specifying a set of candidate intents, wherein a candidate intent corresponds to a task performed by the online system in response to user requests received via the chatbot;
   wherein the chatbot configuration specifies a set of example sentences for each candidate intent and the intent detection model determines the predicted intent of the received natural language sentence by using the neural network to match the received natural language sentence with example sentences for candidate intents specified in the chatbot configuration.

4. The method of claim 3, wherein the online system is a multi-tenant system hosting data and services for a plurality of tenants, wherein the chatbot configuration is specific to a tenant that performs a set of tasks using the multi-tenant system, each task from the set of tasks corresponding to a candidate intent specified in the chatbot configuration.

5. The method of claim 2, further comprising:
   training the neural network using a training dataset including example sentences with known intents.

6. The method of claim 1, further comprising:
   determining whether the predicted intent of the natural language sentence matches the predicted intent of the modified natural language sentence;
   wherein determining the final intent of the natural language sentence to be a negation of the predicted intent of the modified natural language sentence is further responsive to the predicted intent of the natural language sentence matching the predicted intent of the modified natural language sentence.

7. The method of claim 1, further comprising:
   maintaining, by the online system, a set of tasks based on the chatbot conversation, the set of tasks including a task corresponding to the predicted intent of the natural language sentence, wherein responsive to determining that the final intent of the natural language sentence is the negation of the predicted intent of the modified natural language sentence, modifying the set of tasks by removing the task corresponding to the predicted intent of the natural language sentence from the set of tasks; and
   executing all the tasks of the modified set of tasks.

8. The method of claim 1, wherein the natural language sentence is a first natural language sentence, the method further comprising:
   receiving a second natural language sentence from the user during the chatbot conversation, the second natural language sentence including a negation;
   modifying the second natural language sentence by removing the negation of the second natural language sentence;
   predicting an intent of the second natural language sentence using the intent detection model, the intent detection model determining a confidence score for the predicted intent of the second natural language sentence;
   predicting an intent of the modified second natural language sentence using the intent detection model, the intent detection model determining a confidence score for the predicted intent of the modified second natural language sentence;
   responsive to the confidence score for the predicted intent of the modified second natural language sentence failing to exceed the confidence score for the predicted intent of the second natural language sentence by the threshold value, generating a new sentence for confirming a user intent corresponding to the second natural language sentence; and
   sending the generated new sentence to the user.

9. The method of claim 1, wherein the natural language sentence belongs to a plurality of natural language sentences, the plurality of natural language sentences including the natural language sentence and one or more other natural language sentences, the method further comprising:
   for each of the one or more other natural language sentences, determining an intent and a confidence score using the intent detection model;
   determining whether at least one of the intents determined for the one or more other natural language sentences or the predicted intent for the natural language sentence has a value that is not undefined;
   responsive to determining that at least one of the intents determined for the one or more other natural language sentences or the predicted intent for the natural language sentence has a value that is not undefined, determining the final intent to be an intent that has a value that is not undefined and has the highest confidence score.

10. The method of claim 1, wherein the natural language sentence belongs to a plurality of natural language sentences, the plurality of natural language sentences including the natural language sentence and one or more other natural language sentences, the method further comprising:
- for each of the one or more other natural language sentences, determining an intent and a confidence score using the intent detection model;
- determining whether every intent determined for the one or more other natural language sentences and the predicted intent for the natural language sentence has a value that is not undefined;
- responsive to determining that every intent determined for the one or more other natural language sentences and the predicted intent for the natural language sentence has a value that is not undefined, determining the final intent to be an intent with the highest confidence score and sending a generated sentence to the user for confirming the final intent.

11. A computer system comprising:
- a computer processor; and
- a non-transitory computer readable storage medium storing instructions that when executed by the computer processor cause the computer processor to perform steps comprising:
  - receiving, by an online system, a natural language sentence from a user during a chatbot conversation, wherein the natural language sentence includes a negation;
  - predicting an intent of the natural language sentence using an intent detection model, the intent detection model determining a confidence score for the predicted intent of the natural language sentence;
  - modifying the natural language sentence by removing the negation;
  - predicting an intent of the modified natural language sentence using the intent detection model, the intent detection model determining a confidence score for the predicted intent of the modified natural language sentence;
  - responsive to the confidence score for the predicted intent of the modified natural language sentence exceeding the confidence score for the predicted intent of the natural language sentence by a threshold value, determining a final intent of the natural language sentence to be a negation of the predicted intent of the modified natural language sentence;
  - generating a sentence in response to the final intent; and
  - sending the generated sentence to the user in the chatbot conversation.

12. The computer system of claim 11, wherein the intent detection model comprises a neural network configured to receive an input sentence and an example sentence and output a score based on a match between the input sentence and the example sentence, wherein the chatbot conversation is performed using a chatbot, wherein the instructions further cause the computer processor to perform steps comprising:
- receiving a chatbot configuration specifying a set of candidate intents, wherein a candidate intent corresponds to a task performed by the online system in response to user requests received via the chatbot; and
- wherein the chatbot configuration specifies a set of example sentences for each candidate intent and the intent detection model determines the predicted intent of the received natural language sentence by using the neural network to match the received natural language sentence with example sentences for candidate intents specified in the chatbot configuration.

13. The computer system of claim 12, wherein the online system is a multi-tenant system hosting data and services for a plurality of tenants, wherein the chatbot configuration is specific to a tenant that performs a set of tasks using the multi-tenant system, each task from the set of tasks corresponding to a candidate intent specified in the chatbot configuration.

14. The computer system of claim 11, wherein the instructions further cause the computer processor to perform steps comprising:
- determining whether the predicted intent of the natural language sentence matches the predicted intent of the modified natural language sentence;
- wherein determining the final intent of the natural language sentence to be a negation of the predicted intent of the modified natural language sentence is further responsive to the predicted intent of the natural language sentence matching the predicted intent of the modified natural language sentence.

15. The computer system of claim 11, wherein the instructions further cause the computer processor to perform steps comprising:
- maintaining, by the online system, a set of tasks based on the chatbot conversation, the set of tasks including a task corresponding to the predicted intent of the natural language sentence, wherein responsive to determining that the final intent of the natural language sentence is the negation of the predicted intent of the modified natural language sentence, modifying the set of tasks by removing the task corresponding to the predicted intent of the natural language sentence from the set of tasks; and
- executing all the tasks of the modified set of tasks.

16. A non-transitory computer readable storage medium storing instructions that when executed by a computer processor cause the computer processor to perform steps comprising:
- receiving, by an online system, a natural language sentence from a user during a chatbot conversation, wherein the natural language sentence includes a negation;
- predicting an intent of the natural language sentence using an intent detection model, the intent detection model determining a confidence score for the predicted intent of the natural language sentence;
- modifying the natural language sentence by removing the negation;
- predicting an intent of the modified natural language sentence using the intent detection model, the intent detection model determining a confidence score for the predicted intent of the modified natural language sentence;
- responsive to the confidence score for the predicted intent of the modified natural language sentence exceeding the predicted intent of the confidence score for the natural language sentence by a threshold value, determining a final intent of the natural language sentence to be a negation of the predicted intent of the modified natural language sentence;
- generating a sentence in response to the final intent; and
- sending the generated sentence to the user in the chatbot conversation.

17. The non-transitory computer readable storage medium of claim 16, wherein the intent detection model comprises a neural network configured to receive an input sentence and an example sentence and output a score based on a match between the input sentence and the example sentence, wherein the chatbot conversation is performed using a chatbot, wherein the instructions further cause the computer processor to perform steps comprising:

receiving a chatbot configuration specifying a set of candidate intents, wherein a candidate intent corresponds to a task performed by the online system in response to user requests received via the chatbot; and wherein the chatbot configuration specifies a set of example sentences for each candidate intent and the intent detection model determines the predicted intent of the received natural language sentence by using the neural network to match the received natural language sentence with example sentences for candidate intents specified in the chatbot configuration.

18. The non-transitory computer readable storage medium of claim 16, wherein the instructions further cause the computer processor to perform steps comprising:

determining whether the predicted intent of the natural language sentence matches the predicted intent of the modified natural language sentence;

wherein determining the final intent of the natural language sentence to be a negation of the predicted intent of the modified natural language sentence is further responsive to the predicted intent of the natural language sentence matching the predicted intent of the modified natural language sentence.

19. The non-transitory computer readable storage medium of claim 16, wherein the instructions further cause the computer processor to perform steps comprising:

maintaining, by the online system, a set of tasks based on the chatbot conversation, the set of tasks including a task corresponding to the predicted intent of the natural language sentence, wherein responsive to determining that the final intent of the natural language sentence is the negation of the predicted intent of the modified natural language sentence, modifying the set of tasks by removing the task corresponding to the predicted intent of the natural language sentence from the set of tasks; and executing all the tasks of the modified set of tasks.

20. A computer implemented method for determining intent of a user in a chatbot conversation, the method comprising:

receiving, by an online system, a natural language sentence from the user during the chatbot conversation, wherein the natural language sentence includes a pronoun;

predicting a first intent of the natural language sentence using an intent detection model, the intent detection model determining a first confidence score for the first intent;

modifying the natural language sentence by replacing the pronoun with an entity referenced in the conversation; and predicting a second intent of the modified natural language sentence using the intent detection model, the intent detection model outputting a second confidence score for the second intent;

selecting a final intent as the first intent responsive to determining that the first confidence score is greater than the second confidence score or selecting the final intent as the second intent responsive to determining that the second confidence score is greater that the first confidence score; and generating a sentence based on the final intent; and sending the generated sentence to the user in the chatbot conversation.

21. The method of claim 20, wherein the intent detection model comprises a neural network configured to receive an input sentence and an example sentence and output a score based on a match between the input sentence and the example sentence.

22. The method of claim 21, further comprising:

receiving a chatbot configuration specifying a set of candidate intents, wherein the chatbot configuration specifies a set of example sentences and the intent detection model determines the first intent by using the neural network to match the received natural language sentence with example sentences specified in the chatbot configuration and the intent detection model determines the second intent by using the neural network to match the modified natural language sentence with example sentences.

23. The method of claim 22, wherein the online system is a multi-tenant system hosting data and services for a plurality of tenants, wherein the chatbot configuration is specific to a tenant that performs a set of tasks using the multi-tenant system, each task from the set of tasks corresponding to a candidate intent specified in the chatbot configuration.

24. The method of claim 21, further comprising:

training the neural network using a training dataset including example sentences with known intents.

25. The method of claim 20, further comprising:

identifying entities referenced in one or more natural language sentences received from the user;

clustering entities referenced in the one or more natural language sentences;

identifying a cluster in which the pronoun is present; and selecting from the cluster, the entity referenced in the chatbot conversation used for replacing the pronoun.

26. The method of claim 20, wherein the natural language sentence belongs to a plurality of natural language sentences, the plurality of natural language sentences including the natural language sentence and one or more other natural language sentences, the method further comprising:

for each of the one or more other natural language sentences, determining an intent and a confidence score using the intent detection model;

determining whether at least one of the intents determined for the plurality of natural language sentences has a value that is not undefined; and responsive to determining that at least one of the intents determined for the plurality of natural language sentences has a value that is not undefined, determining the final intent to be an intent that has a value that is not undefined and has the highest confidence score.

27. The method of claim 26, further comprising:

generating a sentence for confirming the final intent; and sending the sentence for confirming the final intent to the user.

28. A non-transitory computer readable storage medium storing instructions that when executed by a computer processor cause the computer processor to perform steps comprising:

receiving, by an online system, a natural language sentence from a user during a chatbot conversation, wherein the natural language sentence includes a pronoun;

predicting a first intent of the natural language sentence using an intent detection model, the intent detection model determining a first confidence score for the first intent;

modifying the natural language sentence by replacing the pronoun with an entity referenced in the conversation; and predicting a second intent of the modified natural language sentence using the intent detection model, the intent detection model outputting a second confidence score for the second intent;

selecting a final intent as the first intent responsive to determining that the first confidence score is greater than the second confidence score or selecting the final intent as the second intent responsive to determining that the second confidence score is greater that the first confidence score; and generating a sentence based on the final intent; and sending the generated sentence to the user in the chatbot conversation.

29. The non-transitory computer readable storage medium of claim 28, wherein the intent detection model comprises a neural network configured to receive an input sentence and an example sentence and output a score based on a match between the input sentence and the example sentence.

30. The non-transitory computer readable storage medium of claim 28, wherein the online system receives a chatbot configuration specifying a set of example sentences and the intent detection model determines the first intent by using a neural network to match the received natural language sentence with example sentences specified in the chatbot configuration and the intent detection model determines the second intent by using the neural network to match the modified natural language sentence with example sentences.

31. The non-transitory computer readable storage medium of claim 28, wherein the instructions further cause the computer processor to perform steps comprising:

identifying entities referenced in one or more natural language sentences received from the user;

clustering entities referenced in the one or more natural language sentences;

identifying a cluster in which the pronoun is present; and selecting from the cluster, the entity referenced in the chatbot conversation used for replacing the pronoun.

32. The non-transitory computer readable storage medium of claim 28, wherein the natural language belongs to a plurality of natural language sentences, the plurality of natural language sentences including the natural language sentence and one or more other natural language sentences, wherein the instructions further cause the computer processor to perform steps comprising:

for each of the one or more other natural language sentences, determining an intent and a confidence score using the intent detection model;

determining whether at least one of the intents determined for the plurality of natural language sentences has a value that is not undefined; and responsive to determining that at least one of the intents determined for the plurality of natural language sentences has a value that is not undefined, determining the final intent to be an intent that has a value that is not undefined and has the highest confidence score.

33. A computer system comprising:
a computer processor; and
a non-transitory computer readable storage medium storing instructions that when executed by the computer processor cause the computer processor to perform steps comprising:

receiving a natural language sentence from a user during a chatbot conversation, wherein the natural language sentence includes a pronoun;

predicting a first intent of the natural language sentence using an intent detection model, the intent detection model determining a first confidence score for the first intent;

modifying the natural language sentence by replacing the pronoun with an entity referenced in the conversation; and predicting a second intent of the modified natural language sentence using the intent detection model, the intent detection model outputting a second confidence score for the second intent;

selecting a final intent as the first intent responsive to determining that the first confidence score is greater than the second confidence score or selecting the final intent as the second intent responsive to determining that the second confidence score is greater that the first confidence score; and generating a sentence based on the final intent; and sending the generated sentence to the user in the chatbot conversation.

34. The computer system of claim 33, wherein the intent detection model comprises a neural network configured to receive an input sentence and an example sentence and output a score based on a match between the input sentence and the example sentence.

35. The computer system of claim 33, further comprising instructions to receive a chatbot configuration specifying a set of example sentences, wherein the intent detection model determines the first intent by using a neural network to match the received natural language sentence with example sentences specified in the chatbot configuration and the intent detection model determines the second intent by using the neural network to match the modified natural language sentence with example sentences.

36. The computer system of claim 33, wherein the instructions further cause the computer processor to perform steps comprising:

identifying entities referenced in one or more natural language sentences received from the user;

clustering entities referenced in the one or more natural language sentences;

identifying a cluster in which the pronoun is present; and selecting from the cluster, the entity referenced in the chatbot conversation used for replacing the pronoun.

37. The computer system of claim 33, wherein the natural language belongs to a plurality of natural language sentences, the plurality of natural language sentences including the natural language sentence and one or more other natural language sentences, wherein the instructions further cause the computer processor to perform steps comprising:

for each of the one or more other natural language sentences, determining an intent and a confidence score using the intent detection model;

determining whether at least one of the intents determined for the plurality of natural language sentences has a value that is not undefined; and responsive to determining that at least one of the intents determined for the plurality of natural language sentences has a value that is not undefined, determining the final intent to be an intent that has a value that is not undefined and has the highest confidence score.

* * * * *